United States Patent
Hillis

(10) Patent No.: US 10,073,610 B2
(45) Date of Patent: *Sep. 11, 2018

(54) BOUNDING BOX GESTURE RECOGNITION ON A TOUCH DETECTING INTERACTIVE DISPLAY

(71) Applicant: QUALCOMM Incorporated, San Diego, CA (US)

(72) Inventor: W. Daniel Hillis, Encino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/207,201

(22) Filed: Mar. 12, 2014

(65) Prior Publication Data
US 2014/0195991 A1    Jul. 10, 2014

Related U.S. Application Data

(63) Continuation of application No. 13/413,594, filed on Mar. 6, 2012, now Pat. No. 8,692,792, and a
(Continued)

(51) Int. Cl.
*G06F 3/041*     (2006.01)
*G06F 3/0488*    (2013.01)

(52) U.S. Cl.
CPC ........ *G06F 3/0488* (2013.01); *G06F 3/04883* (2013.01); *G06F 2203/04806* (2013.01); *G06F 2203/04808* (2013.01)

(58) Field of Classification Search
CPC .............. G06F 3/0488; G06F 3/04883; G06F 2203/04808; G06F 2203/04806
(Continued)

(56) References Cited

U.S. PATENT DOCUMENTS 3,478,220 A    11/1969   Milroy
3,673,327 A     6/1972   Johnson et al.
(Continued)

FOREIGN PATENT DOCUMENTS

EP    0881592 B1    10/2002
EP    0881591 B1     9/2003
(Continued)

OTHER PUBLICATIONS

Bennion, N. et al., "Alternate Site Glucose Testing: A Crossover Design," Diabetes Technology & Therapeutics, 2002, vol. 4 (1), pp. 25-33.
(Continued)

*Primary Examiner* — Jimmy H Nguyen
(74) *Attorney, Agent, or Firm* — MG-IP Law, P.C.

(57) ABSTRACT

The invention provides a method and apparatus for identifying gestures performed by a user to control an interactive display. The gestures are identified based on a bounding box enclosing the points at which a user contacts a touch sensor corresponding with the display surface. The invention thus permits the use of inexpensive and highly reliable grid-based touch sensors that provide a bounding box to describe contact information. In identifying the gestures, the position, motion, shape, and deformation of the bounding box may all be considered. In particular, the center, width, height, aspect ratio, length of the diagonal, and orientation of the diagonal of the bounding box may be determined. A stretch factor, defined as the maximum of the ratio of the height of the bounding box to the width of the bounding box and the ratio of the width of the bounding box to the height of the bounding box, may also be computed. Finally, gestures may be identified based on the changes in time of these characteristics and quantities.

20 Claims, 2 Drawing Sheets

ROTATE

Related U.S. Application Data continuation of application No. 12/615,224, filed on Nov. 9, 2009, now Pat. No. 8,139,043, and a continuation of application No. 11/134,802, filed on May 20, 2005, now Pat. No. 7,719,523, and a continuation-in-part of application No. 10/913,105, filed on Aug. 6, 2004, now Pat. No. 7,728,821.

(60) Provisional application No. 60/647,343, filed on Jan. 25, 2005.

(58) Field of Classification Search
USPC .................. 345/173–178; 178/18.01–18.11; 382/181, 182, 184, 187, 189; 715/863
See application file for complete search history.

(56) References Cited

U.S. PATENT DOCUMENTS

| | | | |
|---|---|---|---|
| 3,764,813 | A | 10/1973 | Clement et al. |
| 3,775,560 | A | 11/1973 | Ebeling et al. |
| 3,860,754 | A | 1/1975 | Johnson et al. |
| 4,144,449 | A | 3/1979 | Funk et al. |
| 4,245,634 | A | 1/1981 | Albisser et al. |
| 4,247,767 | A | 1/1981 | O'Brien et al. |
| 4,463,380 | A | 7/1984 | Hooks, Jr. |
| 4,507,557 | A | 3/1985 | Tsikos |
| 4,517,559 | A | 5/1985 | Deitch et al. |
| 4,527,240 | A | 7/1985 | Kvitash |
| 4,722,053 | A | 1/1988 | Dubno et al. |
| 4,742,221 | A | 5/1988 | Sasaki et al. |
| 4,746,770 | A | 5/1988 | McAvinney |
| 4,782,328 | A | 11/1988 | Denlinger |
| 5,105,186 | A | 4/1992 | May |
| 5,239,373 | A | 8/1993 | Tang et al. |
| 5,379,238 | A | 1/1995 | Stark |
| 5,436,639 | A | 7/1995 | Arai et al. |
| 5,448,263 | A | 9/1995 | Martin |
| 5,479,603 | A | 12/1995 | Stone |
| 5,483,261 | A | 1/1996 | Yasutake |
| 5,512,826 | A | 4/1996 | Hardy et al. |
| 5,524,195 | A | 6/1996 | Clanton, III et al. |
| 5,528,263 | A | 6/1996 | Platzker et al. |
| 5,731,979 | A | 3/1998 | Yano et al. |
| 5,971,922 | A | 10/1999 | Arita et al. |
| 5,982,352 | A | 11/1999 | Pryor |
| 6,008,798 | A | 12/1999 | Mato, Jr. et al. |
| 6,037,937 | A | 3/2000 | Beaton et al. |
| 6,057,845 | A | 5/2000 | Dupouy |
| 6,118,433 | A | 9/2000 | Jenkin et al. |
| 6,121,960 | A | 9/2000 | Carroll et al. |
| 6,141,000 | A | 10/2000 | Martin |
| 6,202,026 | B1 | 3/2001 | Nimura et al. |
| 6,215,477 | B1 | 4/2001 | Morrison et al. |
| 6,232,957 | B1 | 5/2001 | Hinckley |
| 6,240,306 | B1 | 5/2001 | Rohrscheib et al. |
| 6,280,381 | B1 | 8/2001 | Malin et al. |
| 6,297,838 | B1 | 10/2001 | Chang et al. |
| 6,309,884 | B1 | 10/2001 | Cooper et al. |
| 6,333,753 | B1 | 12/2001 | Hinckley |
| 6,335,722 | B1 | 1/2002 | Tani et al. |
| 6,335,724 | B1 | 1/2002 | Takekawa et al. |
| 6,337,681 | B1 | 1/2002 | Martin |
| 6,352,351 | B1 | 3/2002 | Ogasahara et al. |
| 6,379,301 | B1 | 4/2002 | Worthington et al. |
| 6,380,929 | B1 | 4/2002 | Platt |
| 6,384,809 | B1 | 5/2002 | Smith |
| 6,414,671 | B1 | 7/2002 | Gillespie et al. |
| 6,415,167 | B1 | 7/2002 | Blank et al. |
| 6,421,042 | B1 | 7/2002 | Omura et al. |
| 6,429,856 | B1 | 8/2002 | Omura et al. |
| 6,442,578 | B1 | 8/2002 | Forcier |
| 6,487,429 | B2 | 11/2002 | Hockersmith et al. |
| 6,504,532 | B1 | 1/2003 | Ogasahara et al. |
| 6,512,529 | B1 | 1/2003 | Janssen et al. |
| 6,512,936 | B1 | 1/2003 | Monfre et al. |
| 6,518,959 | B1 | 2/2003 | Ito et al. |
| 6,528,809 | B1 | 3/2003 | Thomas et al. |
| 6,531,999 | B1 | 3/2003 | Trajkovic |
| 6,532,006 | B1 | 3/2003 | Takekawa et al. |
| 6,563,491 | B1 | 5/2003 | Omura |
| 6,590,568 | B1 | 7/2003 | Astala et al. |
| 6,594,023 | B1 | 7/2003 | Omura et al. |
| 6,608,619 | B2 | 8/2003 | Omura et al. |
| 6,621,483 | B2 | 9/2003 | Wallace et al. |
| 6,636,635 | B2 | 10/2003 | Matsugu |
| 6,651,061 | B2 | 11/2003 | Uchida et al. |
| 6,654,007 | B2 | 11/2003 | Ito |
| 6,654,620 | B2 | 11/2003 | Wu et al. |
| 6,675,030 | B2 | 1/2004 | Ciurczak et al. |
| 6,723,929 | B2 | 4/2004 | Kent |
| 6,747,636 | B2 | 6/2004 | Martin |
| 6,764,185 | B1 | 7/2004 | Beardsley et al. |
| 6,765,558 | B1 | 7/2004 | Dotson |
| 6,788,297 | B2 | 9/2004 | Itoh et al. |
| 6,791,700 | B2 | 9/2004 | Omura et al. |
| 6,803,906 | B1 | 10/2004 | Morrison et al. |
| 6,810,351 | B2 | 10/2004 | Katsurahira |
| 6,825,890 | B2 | 11/2004 | Matsufusa |
| 6,828,959 | B2 | 12/2004 | Takekawa et al. |
| 6,885,883 | B2 | 4/2005 | Parris et al. |
| 6,888,536 | B2 | 5/2005 | Westerman et al. |
| 6,922,642 | B2 | 7/2005 | Sullivan |
| 6,998,247 | B2 | 2/2006 | Monfre et al. |
| 6,999,061 | B2 | 2/2006 | Hara et al. |
| 7,030,861 | B1 | 4/2006 | Westerman et al. |
| 7,061,525 | B1 | 6/2006 | Tanaka et al. |
| 7,184,064 | B2 | 2/2007 | Zimmerman et al. |
| 7,254,775 | B2 | 8/2007 | Geaghan |
| 7,269,801 | B2 | 9/2007 | Kyle et al. |
| 7,339,580 | B2 | 3/2008 | Westerman et al. |
| 7,342,574 | B1 | 3/2008 | Fujioka |
| 7,345,675 | B1 | 3/2008 | Minakuchi et al. |
| 7,392,133 | B2 | 6/2008 | Maruyama et al. |
| 7,411,575 | B2 | 8/2008 | Hill et al. |
| 7,474,296 | B2 | 1/2009 | Obermeyer et al. |
| 7,511,718 | B2 | 3/2009 | Subramanian |
| 7,519,223 | B2 | 4/2009 | Dehlin et al. |
| 7,551,182 | B2 | 6/2009 | Bethune et al. |
| 7,663,607 | B2 | 2/2010 | Hotelling et al. |
| 7,719,523 | B2 | 5/2010 | Hillis et al. |
| 7,724,242 | B2 | 5/2010 | Hillis et al. |
| 7,728,821 | B2 | 6/2010 | Hillis et al. |
| 7,737,951 | B2 | 6/2010 | Pinkus et al. |
| 7,743,348 | B2 | 6/2010 | Robbins et al. |
| 7,746,325 | B2 | 6/2010 | Robert |
| 7,907,124 | B2 | 3/2011 | Hillis et al. |
| 8,072,439 | B2 | 12/2011 | Hillis et al. |
| 8,118,985 | B2 | 2/2012 | Ohya et al. |
| 8,139,043 | B2 | 3/2012 | Hillis |
| 8,188,985 | B2 | 5/2012 | Hillis et al. |
| 8,269,739 | B2 | 9/2012 | Hillis et al. |
| 8,402,372 | B2 | 3/2013 | Gillespie |
| 8,560,972 | B2 | 10/2013 | Wilson |
| 8,624,863 | B2 | 1/2014 | Hillis et al. |
| 2001/0016682 | A1 | 8/2001 | Berner et al. |
| 2001/0019325 | A1 | 9/2001 | Takekawa |
| 2001/0022579 | A1 | 9/2001 | Hirabayashi |
| 2001/0026268 | A1 | 10/2001 | Ito |
| 2001/0035880 | A1 | 11/2001 | Musatov |
| 2002/0015064 | A1 | 2/2002 | Robotham et al. |
| 2002/0018051 | A1 | 2/2002 | Singh |
| 2002/0019022 | A1 | 2/2002 | Dunn et al. |
| 2002/0036617 | A1 | 3/2002 | Pryor |
| 2002/0132279 | A1 | 9/2002 | Hockersmith |
| 2002/0163547 | A1 | 11/2002 | Abramson et al. |
| 2002/0185981 | A1 | 12/2002 | Dietz et al. |
| 2003/0001825 | A1 | 1/2003 | Omura et al. |
| 2003/0043174 | A1 | 3/2003 | Hinckley et al. |
| 2003/0063775 | A1 | 4/2003 | Rafii et al. |
| 2003/0137494 | A1 | 7/2003 | Tulbert |
| 2003/0156145 | A1 | 8/2003 | Hullender et al. |
| 2003/0159567 | A1 | 8/2003 | Subotnick |
| 2003/0214481 | A1 | 11/2003 | Xiong |
| 2003/0227469 | A1 | 12/2003 | Kamikawa et al. |

(56) References Cited

U.S. PATENT DOCUMENTS

| | | |
|---|---|---|
| 2003/0231167 A1 | 12/2003 | Leung |
| 2004/0033618 A1 | 2/2004 | Haass et al. |
| 2004/0046744 A1 | 3/2004 | Rafii et al. |
| 2004/0106163 A1 | 6/2004 | Workman et al. |
| 2005/0038674 A1 | 2/2005 | Braig et al. |
| 2005/0052427 A1 | 3/2005 | Wu et al. |
| 2005/0052472 A1 | 3/2005 | Hashizume |
| 2005/0106651 A1 | 5/2005 | Chaiken et al. |
| 2006/0010400 A1 | 1/2006 | Dehlin et al. |
| 2006/0022955 A1 | 2/2006 | Kennedy |
| 2006/0026521 A1 | 2/2006 | Hotelling et al. |
| 2006/0026536 A1 | 2/2006 | Hotelling et al. |
| 2006/0031786 A1 | 2/2006 | Hillis et al. |
| 2006/0063218 A1 | 3/2006 | Bartkowiak et al. |
| 2006/0190172 A1 | 8/2006 | Cross et al. |
| 2007/0252821 A1 | 11/2007 | Hollemans et al. |
| 2007/0268273 A1 | 11/2007 | Westerman et al. |
| 2008/0211785 A1 | 9/2008 | Hotelling et al. |
| 2010/0234638 A1 | 9/2010 | Fitzpatrick |
| 2011/0039602 A1 | 2/2011 | McNamara et al. |
| 2011/0050394 A1 | 3/2011 | Zhang et al. |
| 2011/0169780 A1 | 7/2011 | Goertz |
| 2012/0206393 A1 | 8/2012 | Hillis et al. |
| 2012/0223971 A1 | 9/2012 | Hillis |
| 2012/0331415 A1 | 12/2012 | Hillis et al. |
| 2013/0082967 A1 | 4/2013 | Hillis et al. |
| 2014/0149951 A1 | 5/2014 | Hillis et al. |

FOREIGN PATENT DOCUMENTS

| | | |
|---|---|---|
| JP | 2001175807 A | 6/2001 |
| WO | WO-0216905 A2 | 2/2002 |

OTHER PUBLICATIONS

Blank T.B., et al., "Clinical Results from a Noninvasive Blood Glucose Monitor," Proceedings of SPIE, Optical Diagnostics and Sensing of Biological Fluids and Glucose and Cholesterol Monitoring II, May 23, 2002, vol. 4624. pp. 1-10.
"Diabetes Statistics," Nov. 1997, Publication No. 98-3926, National Institutes of Health, Bethesda.
Dietz P. et al., "Diamond Touch: A Multi-User Touch Technology", Proceedings of the 14th annual ACM symposium on User interface software and technology (UIST '01), 2001, published on Oct. 2003, pp. 219-226.
Esenther, et al., "Diamond Touch SDK: Support for Multi-User, Multi-Touch Applications," Mitsubishi Electric Research Laboratories, TR2002-048, Nov. 2002, 5 Pages.
Essenther, et al., "Diamond Touch for Multi-User Multi-Touch Applications—ACM Conference on Computer Supported Cooperative Work," Nov. 2002, (CSCW 2002, TR2002-048).
Fekete J. D., et al., "A Multi-Layer Graphic Model for Building Interactive Graphical Applications", 1996, 7 pages.
Fischer J.S., et al., "Comparisons of Capillary Blood Glucose Concentrations from the Fingertips and the Volar Aspects of the Left and Right Forearm", Instrumentations Metrics, Inc., American Diabetes Association, 62 Annual Meeting, Jun. 14, 2002.
"Functionality: Introduction, Functionality: Console Display, NCSA-GMSlab Team," NCSA(National Center for Supercomputing Applications), Mississippi River Web Museum Consortium, University of Illinois, 2003.
Hazen K.H., et al., "Glucose Determination in Biological Matrices Using Near-Infrared Spectroscopy," 1995, Doctoral Dissertation, University of Iowa.
Hinckley K. et al., "Synchronous Gestures for Multiple Persons and Computers", Proceeding of ACM Symposium, User Interface Software and Technology (UIST '03), 2003, vol. 5, Issue 2, pp. 149-158.
Johnston D.M., et al., "GM Slab Function," NCSA (National Center for Supercomputing Applications), University of Illinois, Jul. 10, 2003, 5 Pages.

Jungheim K., et al., "Glucose Monitoring at the Arm," Diabetes Care, Jun. 2002, vol. 25 (6), pp. 956-960.
Jungheim K., et al., "Risky Delay of Hypoglycemia Detection by Glucose Monitoring at the Arm," Diabetes Care, Jul. 2001, vol. 24 (7), pp. 1303-1304.
Khalil O.S., "Spectroscopic and Clinical Aspects of Noninvasive Glucose Measurements," Clinical Chemistry, 1999, vol. 45 (2), pp. 165-177.
Klonoff D.C., "Noninvasive Blood Glucose Monitoring," Mar. 1997, Diabetes Care, vol. 20 (3), pp. 433-437.
Lee D.M., et al., "A Study of Forearm Versus Finger Stick Glucose Monitoring," Diabetes Technology & Therapeutics, 2001, vol. 4 (1), pp. 13-23.
Malik S. et al., "Visual Touchpad: A Two-handed Gestural Input Device", In Conference on Multimodal Interfaces (ICMI'04), Oct. 13-15, 2004, 8 Pages.
Malin S.F., et al., "Noninvasive Prediction of Glucose by Near Infrared Spectroscopy", Clinical Chemistry, 1999, vol. 45 (9), pp. 1651-1658.
Matt W., et al., "Alternative Site: Fingertip vs. Forearm", Instrumentation Metrics, Inc., Internal Report, Dec. 12, 2001.
McGarraugh G., et al., "Glucose Measurements Using Blood Extracted from the Forearm and Finger," TheraSense, Inc., ART010022 Rev. C, 2001.
McGarraugh G., et al., "Physiological Influences on Off-Finger Glucose Testing," Diabetes Technology & Therapeutics, 2001, vol. 3 (3), pp. 367-376.
McGarraugh, G., "Response to Jungheim and Koschinsky," Comments and Responses, Diabetes Care, Jul. 2001, vol. 24 (7), pp. 1304-1306.
Monfre S.L., et al., "Physiologic Differences between Volar and Dorsal Capillary Forearm Glucose Concentrations and Finger Stick Concentrations in Diabetics", Instrumentations Metrics, Inc., American Diabetes Association, 62 Annual Meeting, Jun. 14, 2002.
National Center for Supercomputing Applications (NCSA) Overview; Mississippi RiverWeb Museum Consortium; Jun. 13, 2005; Johnson and Curtis Univ. of Illinois.
NCSA (National Center for Supercomputing Applications); GM Slab Console; Museum Consortium; Jul. 10, 2003, Jhonson and Curtis University of Illinois.
NCSA (National Center for Supercomputing Applications); GM Slab Function; Museum Consortium; Jul. 10, 2003, Jhonson and Curtis University of Illinois.
Notice of Allowance dated Aug. 1, 2011 U.S. Appl. No. 12/615,224.
Paradiso J., et al., "The Laser Wall," MIT Media Lab, Sep. 1997, 3 Pages, Retrieved from <URL: http://web. media.mit.edu/~joep/SpectrumWeb/captions/Laser.html>.
Peled N., et al., "Comparison of Glucose Levels in Capillary Blood Samples from a Variety of Body Sites", Diabetes Technology & Therapeutics, 2002, vol. 4 (1), pp. 35-44.
Peripheral Circulation, Johnson P.C. Ed., New York, 1978, pp. 198.
Rekimoto J. et al., "Perceptual Surfaces: Towards a Human and Object Sensitive Interactive Display", Sony Computer Science Laboratory Inc, Mar. 14, 2013, 3 Pages.
Rekimoto J., "SmartSkin: An Infrastructure for Freehand Manipulation on Interactive Surfaces," Interaction Laboratory Sony Computer Science Laboratories, CHI Apr. 2002, pp. 1-11, Retrieved from <URL: http://www.csl.sony.co.jp/person/rekimoto/smartskin>.
Rosenberg I. et al., "The UnMousePad—An Interpolating Multi-Touch Force-Sensing Input Pad", ACM Transactions on Graphics, vol. 28, No. 3, Article 65, Aug. 2009, 10 Pages.
Ryall K., et al., "Diamond Touch Applications," Mitsubishi Electric Research Laboratories, Aug. 2, 2004.
Ryan T.J., "A Study of the Epidermal Capillary Unit in Psoriasis", Dermatologica, 1969, vol. 138, pp. 459-472.
Small C., "Touchscreens Provide a Robust and Intuitive User Interface," TechOnline, 1996-2005.
Small C., "Touchscreens Provide a Robust and Intuitive User Interface," TechOnline, May 24, 2002, pp. 1-6, Retrieved from <URL: www.techonline.com/showArticle.jhtm I?articleID=192200401 &queryText=touch+screen>.

(56) References Cited

OTHER PUBLICATIONS

Smart Technologies, "Smart Board for Flat Panel Displays (interactive Overlay)", Nov. 2003, 2 Pages.
Sparks H.V., "Skin and Muscle", Peripheral Circulation, New York, 1978, pp. 193-230.
Summary Minutes of the Clinical Chemistry and Clinical Toxicology Devices Meeting, Oct. 29, 2001.
Supplementary European Search Report—EP06827865—Search Authority—Munich—dated Dec. 11, 2013.
Supplementary Search Report—EP06760190, Search Authority—Munich Patent Office—dated May 31, 2012.
Szuts, Ete Z., et al., "Blood Glucose Concentrations of Arm and Finger During Dynamic Glucose Conditions", Diabetes Technology & Therapeutics, 2002, vol. 4 (1), pp. 3-11.
Tamada J.A., et al., "Noninvasive Glucose Monitoring Comprehensive Clinical Results", Journal of the American Medical Association, 1999, vol. 282 (19), pp. 1839-1844.
The Diabetes Control and Complications Trial Research Group, "The Effect of Intensive Treatment of Diabetes on the Development and Progression of Long-Term Complication in Insulin-Dependent Diabetes Mellitus", The New England Journal of Medicine, 1993, vol. 329 (14), pp. 997-986.
U.K. Prospective Diabetes Study (UKPDS) Group, "Intensive Blood-Glucose Control with Sulphonylureas or Insulin Compared with Conventional Treatment and Risk of Complications in Patients with Type 2 Ddiabetes (UKPDS 33)," The Lancet, vol. 352, Sep. 12, 1998, pp. 837-853.
Wah NG C. et al., "Real-time gesture recognition system and application", Image and Vision Computing, vol. 20, 2002, pp. 993-1007.
Westerman W. et al., "Multi-Touch: A New Tactile 2-D Gesture Interface for Human Computer Interaction", Proceedings of the Human Factors and Ergonomics Society 45th Annual Meeting, 2001, pp. 632-636.
Wu M., et al., "Gesture Registration, Relaxation, and Reuse for Multi-Point Direct-Touch Surfaces," Proceedings of IEEE Tabletop 2006 Conference on Horizontal Interactive Human-Computer Systems, Adelaide, South Australia, 2003, 8 Pages.
Wu M., et al., "Multi-Finger and Whole Hand Gestural Interaction Techniques for Multi-User Tabletop Displays," ACM CHI Letters, ACM UIST 2003 Symposium on User interface Software & Technology, Vancouver, Canada, Nov. 2003, vol. 5 (2), pp. 193-202.
Yasuo O., et al., "Intensive Insulin Therapy Prevents the Progression of Diabetic Microvascular Complications in Japanese Patients with Non-Insulin-Dependent Diabetes Mellitus: A Randomized Prospective 6-year Study," Diabetes Research and Clinical Practice, 1995, vol. 28, pp. 103-117.
Zheng P., et al., "Noninvasive Glucose Determination by Oscillating Thermal Gradient Spectrometry," Diabetes Technology & Therapeutics, 2000, vol. 2 (1), pp. 17-25.
Zlatko T., et al., "Open-Flow Microperfusion of Subcutaneous Adipose Tissue for On-Line Continuous Ex Vivo Measurement of Glucose Concentration," Diabetes Care, Jul. 1997, vol. 20 (7), pp. 1114-1120.
Zlatko T., et al., "Portable Device for Continuous Fractionated Blood Sampling and Continuous Ex Vivo Blood Glucose Monitoring", Biosensors & Bioelectronics, 1996, vol. 11 (5), pp. 479-487.
Co Pending U.S. Appl. No. 09/766,427,Hockersmith et al., filed Jan. 18, 2001.
Borkowski, S., et al., "Spatial Control of Interactive Surfaces in an Augmented Environment," European Conference on Human Computer Interaction, EHCI 04, Jul. 2004, 15 pages.
Florence, J., et al., "The GIS WallBoard: Interactions with Spatial Information on Large-Scale Displays," Seventh International Symposium on Spatial Data Handling, 1996, 11 pages.
Lieberman, H., "A Multi-Scale, Multi-Layer, Translucent Virtual Space," IEEE International Conference on Information Visualization, London, Sep. 1997, 8 pages.
Oviatt, S., "Multimodal Interfaces for Dynamic Interactive Maps," Proceedings of the SIGCHI Conference on Human Factors in Computing Systems, Apr. 13-18, 1996, pp. 95-102.
Report on the Filing or Determination of an Action Regarding a Patent or Trademark—Case 3:17-cv-02403, filed Nov. 30, 2017, 1 page.

PAN

ZOOM

ROTATE ruption of beams is created by a contact point $C_2$. The locations of the contact points $(x_1, y_1)$ and $(x_2, y_2)$ are determined by considering the x and y locations of the interrupted beams. A well known shortcoming of this approach to determining contact locations is a ghosting effect in which the pair of contact locations $C_1$ and $C_2$ cannot be distinguished from the pair of contact locations $C_{1'}$ and $C_{2'}$. Accordingly, the contact information returned by grid-based touch sensor is best considered as a bounding box defined by the rectangle $C_1C_{1'}C_2C_{2'}$.

This method of determining and reporting the locations of contacts differentiates grid-based sensors from many other touch sensor technologies such as the Synaptics TouchPad™ found on many laptop computers. By measuring changes in capacitance near a wire mesh, the TouchPad™ determines contact positions directly and reports an absolute position to the host device. Clearly, an ability to directly ascertain and report the position of a contact is in many situations advantageous. However, capacitive sensors do not scale well, and are therefore impractical or prohibitively expensive for incorporation into large interactive displays.

A number of methods have been proposed for recognizing user gestures through tracking the position and motion of one or more contact locations determined by a touch sensor. Clearly, these methods encounter difficulty when used in conjunction with a grid-based sensor that cannot disambiguate the location of multiple simultaneous contact points. It would thus be advantageous to define a set of user gestures in terms of the bounding box surrounding the detected contact locations. Such a set of user gestures would permit the use of inexpensive, highly reliable, and highly scalable grid-based touch sensors yet still allow users to interact with the display in an intuitive manner.

SUMMARY

The invention provides a method and apparatus for identifying gestures performed by a user to control an interactive display. The gestures are identified based on a bounding box enclosing the points at which a user contacts a touch sensor corresponding with the display surface. The invention thus permits the use of inexpensive and highly reliable grid-based touch sensors that provide a bounding box to describe contact information. In identifying the gestures, the position, motion, shape, and deformation of the bounding box may all be considered. In particular, the center, width, height, aspect ratio, length of the diagonal, and orientation of the diagonal of the bounding box may be determined. A stretch factor, defined as the maximum of the ratio of the height of the bounding box to the width of the bounding box and the ratio of the width of the bounding box to the height of the bounding box, may also be computed. Finally, gestures may be identified based on the changes in time of these characteristics and quantities.

Gestures that may be identified include pan, zoom, and rotate gestures. Display commands that may be associated with the identified gestures include, panning, zooming, and rotation commands that, when executed, provide a translation, a change in the magnification, or a change in the orientation of the displayed imagery. In a preferred embodiment of the invention, a pan gesture is identified only if the motion of the bounding box is greater than a predetermined motion threshold and the deformation of the bounding box is less than a predetermined deformation threshold. A zoom gesture is identified only if the stretch factor is greater than a predetermined stretch threshold and is increasing. A rotate gesture is identified only if the deformation of the bounding

BOUNDING BOX GESTURE RECOGNITION ON A TOUCH DETECTING INTERACTIVE DISPLAY

CROSS REFERENCE TO RELATED APPLICATIONS

This application is a Continuation of U.S. patent application Ser. No. 13/413,594, filed Mar. 6, 2012, pending, which is a Continuation of U.S. patent application Ser. No. 12/615,224, filed Nov. 9, 2009, patented, as U.S. Pat. No. 8,139,043, which is a continuation of U.S. patent application Ser. No. 11/134,802, filed May 24, 2005, patented, as U.S. Pat. No. 7,719,523, which claims the benefit of Provisional Application 60/647,343, filed Jan. 25, 2005 and which was also a Continuation-in-Part of U.S. patent application Ser. No. 10/913,105, filed Aug. 6, 2004, patented, as U.S. Pat. No. 7,728,821. Each of the foregoing applications is incorporated herein in its entirety by this reference thereto.

BACKGROUND

Technical Field

The invention relates to interactive displays. More particularly, the invention relates to a method and apparatus for determining user gestures to control a touch detecting, interactive display.

Description of the Prior Art

There are many situations in which one or more individuals interactively explore image-based data. For example, a team of paleontologists may wish to discuss an excavation plan for a remote dig site. To do so, they wish to explore in detail the geographic characteristics of the site as represented on digitized maps. In most laboratories, this requires the team either to huddle around a single workstation and view maps and images on a small display, or sit at separate workstations and converse by phone. The activity of exploring imagery is much more easily and effectively accomplished with the users surrounding a single large display. A particularly effective approach is a touch detecting, interactive display such as that disclosed in the related patent application entitled Touch Detecting Interactive Display, filed Aug. 6, 2004, Ser. No. 10/913,105. In such a system, an image is produced on a touch detecting display surface. A touch sensor determines the locations at which a user contacts the display surface, and based on the position and motions of these locations, user gestures are determined. The display is then updated based on the determined user gestures.

A wide variety of mechanisms are available for determining the locations at which a user contacts the touch sensor. Often, a grid-based approach is used in which measurements acquired on the perimeter of the touch sensor indicate a horizontal coordinate $x_1$ and a vertical coordinate $y_1$ for each contact location.

FIG. 1 shows a schematic diagram that shows a prior art infrared break-beam, grid-based touch sensor for determining the coordinates of two contact locations. The approach shown is similar to that disclosed in U.S. Pat. No. 3,478,220 to Milroy, U.S. Pat. No. 3,764,813 to Clement et al., U.S. Pat. No. 3,775,560 to Ebeling et al., and U.S. Pat. No. 3,860,754 to Johnson et al. These systems incorporate a series of horizontal and vertical beams generated by infrared LED's and a corresponding series of infrared sensors. In FIG. 1, a point of contact $C_1$ interrupts the beam of light passing from an emitter $E_{1x}$ to a sensor $S_{1x}$ and the beam of light passing from an emitter $E_{1y}$ to a sensor $S_{1y}$. A similar box is greater than a predetermined deformation threshold. Ambiguity in the direction of rotation implied by a rotate gesture is resolved by a convention in which the bounding box is specified with a particular pair of opposing corners, e.g. lower left and upper right, determining the relative intensity of contact locations, or measuring the torque applied by the user to the display surface.

DETAILED DESCRIPTION

The invention provides a method and apparatus for identifying gestures performed by a user to control an interactive display. The gestures are identified based on a bounding box enclosing the points at which a user contacts a touch sensor corresponding with the display surface. The invention thus permits the use of inexpensive and highly reliable grid-based touch sensors that provide a bounding box to describe contact information.

Figure 2:
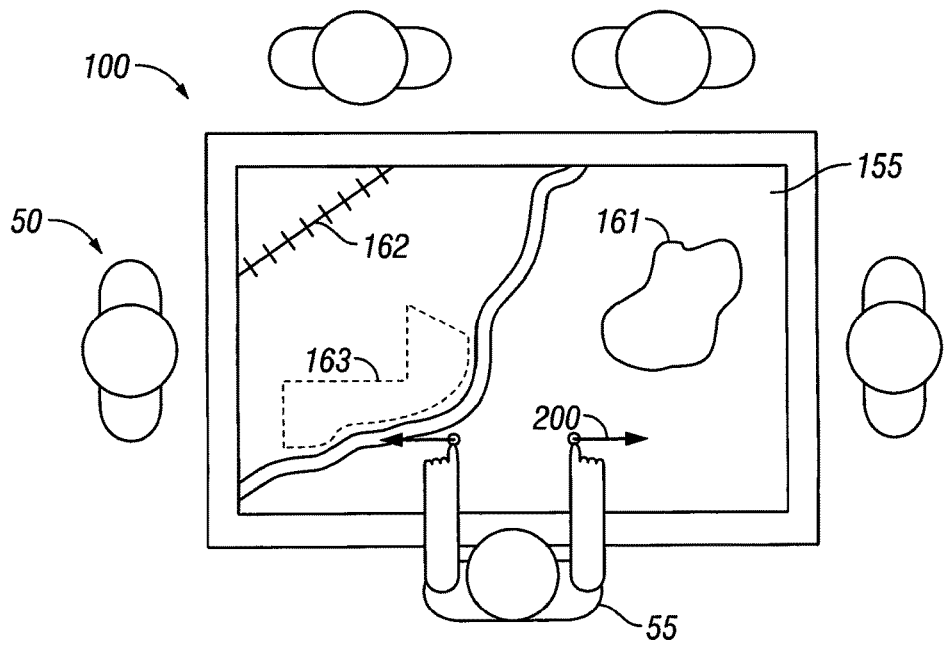
FIG. 2 shows is a schematic diagram that shows several users operating an exemplary interactive display in which the invention may be used.

FIG. 2 shows a schematic diagram that shows several users operating an exemplary interactive display in which the invention may be used. The users 50 surround the display 100 such that each can view the display surface 150, which shows imagery of interest to the users. For example, the display may present Geographic Information System (GIS) imagery characterized by geographic 161, economic 162, political 163, and other features, organized into one or more imagery layers. Because the users can comfortably surround and view the display, group discussion and interaction with the display is readily facilitated.

Corresponding to the display surface is a touch sensor 155 that is capable of detecting when and where a user touches the display surface. Based upon the contact information provided by the touch sensor, user gestures are identified, and a command associated with the user gesture is determined. The command is executed, altering the displayed imagery in the manner requested by the user via the gesture. For example, in FIG. 2, a user 55 gestures by placing his fingertips on the display surface and moving them in an outwardly separating manner. This particular gesture 200 is preferably associated with an inward zoom command. When the zoom command is executed, the display provides a closer, more detailed view of the displayed imagery.

In the preferred embodiment of the invention the touch sensor and the display are physically coincident as shown In FIG. 2. This may be achieved, for example, by projecting imagery onto a horizontal touch sensor with an overhead projector. However, in alternative embodiments of the invention, the touch sensor and display are physically separate.

Figure 1:
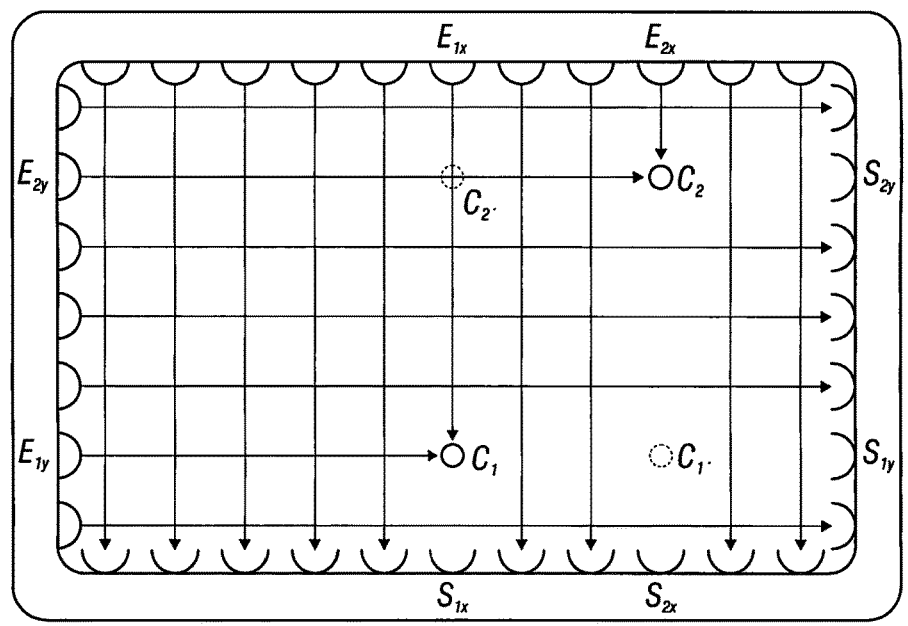
FIG. 1 shows is a schematic diagram that shows a prior art infrared break-beam, grid-based touch sensor for determining the coordinates of two contact locations.

As noted above, cost and reliability often motivate the use of a grid-based sensor in touch detecting displays that, as shown in FIG. 1, typically returns contact information in the form of a bounding box enclosing the detected contact locations. Defining a set of gestures in terms of the bounding box position, shape, motion, and deformation is therefore of great benefit.

Figure 3A:
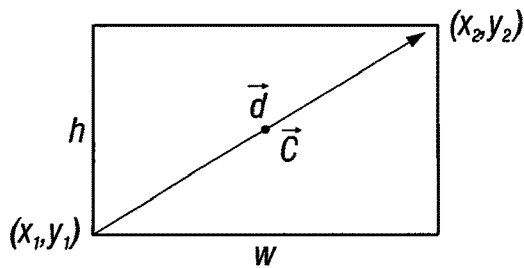
FIGS. 3a-3d shows several gestures identified based on bounding box position, shape, motion, and deformation according to the invention.

FIGS. 3a-3d show several gestures identified based on bounding box position, shape, motion, and deformation according to the invention. As shown in FIG. 3a, the contact information returned by the grid-based touch sensor is summarized by a bounding box described, by convention, by the coordinates of the lower left $(x_1, y_1)$ and upper right $(x_2, y_2)$ corners of the bounding box. The invention uses this information to identify the user gestures. Generally, gestures may be identified based on any of the center, aspect ratio, diagonal, length of the diagonal, and orientation of the diagonal of the bounding box. Gestures may also be identified based on the changes over time of any of these quantities.

Figure 3B:
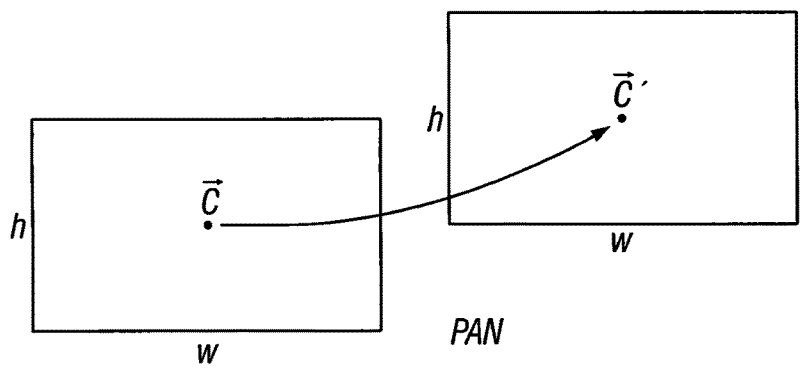
Figure 3C:
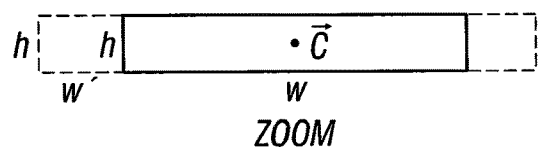
Figure 3D:
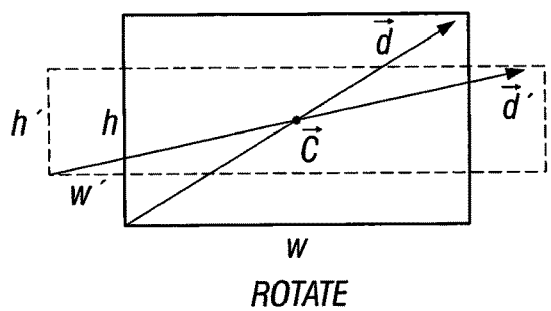

In the preferred embodiment of the invention, gestures are identified using the procedure detailed below and illustrated in FIGS. 3b-3d. Upon receipt of a bounding box from the touch sensor:

1. The bounding box width w, height h, center $\vec{C}$, and diagonal $\vec{d}$, are determined based on the corners of the bounding box.
2. The aspect ratio of the bounding box $$A = \frac{h}{w}$$

and the stretch factor of the bounding box $$S = \max\left[A, \frac{1}{A}\right]$$

are determined.

3. The rate of change of each of these parameters is determined based on a history of each parameter. More specifically, $\dot{w}$, $\dot{h}$, $\dot{\vec{C}}$, and $\dot{\vec{d}}$ are determined, where $\dot{Q}$ denotes the first derivative with respect to time of the quantity Q. The time derivatives may be computed using one or more of the previous parameter values, that is, using first or higher order derivative approximations.
4. The rate of change of the minimum and maximum of the length and width $$\frac{d}{dt}(\min[w, h])$$

and $$\frac{d}{dt}(\max[w, h])$$

are determined. The time derivatives may be computed using one or more of the previous parameter values, that is, using first or higher order derivative approximations.

5. Then,

If $\dot{w} < \varepsilon_1$, $\dot{h} < \varepsilon_1$, and $|\dot{\vec{C}}| \geq \varepsilon_c$, that is, if the bounding box is moved significantly but not deformed significantly, a pan gesture is identified.

If $S > 1 + \varepsilon_S$, $$\left|\frac{d}{dt}(\min[w, h])\right| < \varepsilon_l,$$

and $$\left|\frac{d}{dt}(\max[w, h])\right| \geq \varepsilon_l,$$

that is, if a stretch factor of an already stretched bounding box is increased or decreased significantly, a zoom gesture is identified.

If $|\dot{w}| \geq \varepsilon_1$, $|\dot{h}| \geq \varepsilon_1$, and $|\dot{\vec{C}}| < \varepsilon_c$, that is, if the bounding box is deformed significantly but not moved significantly, a rotate gesture is identified.

Else, no gesture is identified.

$\varepsilon_1$ and $\varepsilon_c$ are predetermined thresholds corresponding to the ability of a typical user to hold the corresponding bounding box parameter constant while executing a gesture. $\varepsilon_S$ is a minimum stretch factor above which gestures may be considered an inward or outward zoom. The values of the thresholds may be adjusted to yield a desired gesture classification behavior.

After a gesture is identified, a display command consistent with the identified gesture is determined, and the display is updated appropriately. In the preferred embodiment of the invention:

If a pan gesture is identified, the display is translated at constant magnification and orientation in the direction of $\dot{\vec{C}}$ at a rate proportional to $|\dot{\vec{C}}|$;

If a zoom gesture is identified, the magnification of the display is increased or decreased about the center of the display at a rate proportional to $$\left|\frac{d}{dt}(\max[w, h])\right|.$$

Alternatively, the display the magnification of the display may be changed about the current bounding box center $\vec{C}$; and If a rotate gestures is identified, the display is rotated about the center of the display at a rate proportional to $$\frac{d}{dt}(\angle \vec{d}).$$

Preferably, the display is rotated about its center. Alternatively, the display may be rotated about the current bounding box center $\vec{C}$.

In the preferred embodiment of the invention, the identification procedure is performed upon or shortly after initiation of contact by the user. Once the gesture has been identified, the identification is maintained until the contact is terminated. Throughout the duration of the contact, the display is continually updated, preferably each time updated bounding box information is received from the touch sensor. Initiation and termination of the single gesture are therefore determined based upon the appearance and disappearance of the bounding box, which is typically an event explicitly declared by the touch sensor.

Experimentation has indicated that such a rigid gesture classification is preferred by users, because it is difficult in practice to execute gestures that are purely of one type. Classifying the bounding box motion and deformation as a gesture of one type averts the frustration experienced by a user when, for example, an attempt to zoom results in both a zooming and a rotating motion of the display.

Nonetheless, in an alternative embodiment of the invention, the identification procedure is performed more frequently. For example, the identification procedure may be performed each time updated bounding box information is received from the touch sensor. In this approach, a single user motion, as delineated by the appearance and disappearance of a bounding box, potentially contains pan, zoom, and rotate gestures. Over the duration of the gesture, the display is updated with a combination of panning, zooming, and rotational motions that, to the user, appear smooth and continuous. Successful implementation of this embodiment requires especially careful selection of the thresholds $\varepsilon_1$, $\varepsilon_c$, and $\varepsilon_S$.

In the above gesture identification procedure, the gesture for rotation remains partly ambiguous. Specifically, the direction of rotation cannot be determined from the bounding box alone. The pairs of points $[C_1, C_2]$ and $[C_1, C_{2'}]$ of FIG. 1 that possibly define the bounding box result in opposite directions of rotation. This ambiguity may be addressed through a number of approaches. In one approach, users adopt a convention of designating the bounding box with the lower left and upper right corners, or the upper left and lower right corners. In another approach, the gesture identification procedure assumes a single direction of rotation, regardless of the actual points of contact. In yet another approach, the ghosting effect of FIG. 1 may be truly disambiguated. In the case of grid-based sensors, for example, the true points of contact typically provide a stronger signal than do the ghost points of contact. The relative strength of the pairs of points $[C_1, C_2]$ and $[C_1, C_{2'}]$ may be used to determine the true contacts and therefore the correct direction of rotation. Finally, a measurement of the torque applied to the display surface may be made to ascertain directly the direction of rotation implied by the user gesture.

It should be noted that although the invention is described above with reference to a bounding box defined by two contact locations, the bounding box may also be defined for the case of three or more contact points. For a set of contact points $C_i$ defined by contact locations $(x_i, y_i)$, the bounding box is defined by the corners $(\min[x_i], \min[y_i])$ and $(\max[x_i], \max[y_i])$.

While the description herein references a grid-based sensor incorporating a series of infrared emitters and receivers, the invention is equally applicable to other grid-based sensors. For example, the invention may be used with laser break-beam grids, resistive grids, capacitive grids, and arrays of acoustic, e.g. ultrasonic, emitters and microphones. The invention may also be used with non-grid-based sensors that return contact information in the form of a bounding box.

Finally, while the invention is described with reference to a rectangular bounding box, alternative embodiments of the invention may used non-rectangular bounding boxes. For example, a touch sensor incorporating corner based sensors that determine an angular bearing to each point of contact may return contact information in the form of a quadrilateral bounding box. The techniques described herein can be applied to a generalized quadrilateral bounding box with appropriate definition of a bounding box center, width, height, aspect ratio, and diagonal. The invention may thus be used in conjunction with sensors that are not strictly grid-based.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following Claims.

The invention claimed is:

1. In an interactive display, a method for identifying a specific user gesture, the method comprising:
   displaying imagery on an imaging surface of the interactive display;
   detecting a plurality of contact locations at which at least one user contacts a touch sensor to control the interactive display;
   responsive to a determination that a deformation of a bounding box enclosing at least two of said plurality of contact locations exceeds a predetermined deformation threshold and responsive to a determination that a motion of said bounding box is less than a predetermined motion threshold, identifying said specific user gesture as a rotate gesture;
   determining a direction of rotation of the bounding box based on characteristics of the at least two of said plurality of contact locations;
   associating said specific user gesture with a display command; and
   executing said display command to alter the imagery.

2. The method of claim 1, wherein the determining the direction of rotation further comprises designating said bounding box with one of an upper left corner and a lower right corner or a lower left corner and an upper right corner.

3. The method of claim 1, further comprising arbitrarily choosing the direction of rotation responsive to a determination the direction of rotation is ambiguous.

4. The method of claim 1, wherein the characteristics of the at least two of said plurality of contact locations includes a measurement of a torque applied to the touch sensor.

5. The method of claim 1, wherein the characteristics of the at least two of said plurality of contact locations includes a relative intensity of the at least two of said plurality of contact locations.

6. The method of claim 5, wherein the characteristics of the at least two of said plurality of contact locations includes a strength of contact for each of the at least two of said plurality of contact locations.

7. The method of claim 5, further comprising determining at least two true points of contact based on the relative intensity of the at least two of said plurality of contact locations.

8. An interactive display comprising:
   means for displaying imagery on an imaging surface of the interactive display;
   a touch sensor corresponding to said imaging surface;
   means for detecting a plurality of contact locations at which at least one user contacts said touch sensor to control said interactive display;
   means for identifying a rotate gesture that determines if a deformation of a bounding box surrounding at least two of said plurality of contact locations is greater than a predetermined deformation threshold and determines if a motion of said bounding box is less than a predetermined motion threshold;
   means for determining a direction of rotation of the bounding box based on characteristics of the at least two of said plurality of contact locations;
   means for associating said rotate gesture with a corresponding display command; and
   means for executing said corresponding display command to alter the imagery.

9. The interactive display of claim 8, wherein the means for determining the direction of rotation designates said bounding box with one of an upper left corner and a lower right corner or a lower left corner and an upper right corner.

10. The interactive display of claim 8, further comprising means for arbitrarily choosing the direction of rotation responsive to a determination the direction of rotation is ambiguous.

11. The interactive display of claim 8, wherein the characteristics of the at least two of said plurality of contact locations includes a measurement of a torque applied to the touch sensor.

12. The interactive display of claim 8, wherein the characteristics of the at least two of said plurality of contact locations includes a relative intensity of the at least two of said plurality of contact locations.

13. The interactive display of claim 12, wherein the characteristics of the at least two of said plurality of contact locations includes a strength of contact for each of the at least two of said plurality of contact locations.

14. The interactive display of claim 12, further comprising determining at least two true points of contact based on the relative intensity of the at least two of said plurality of contact locations.

15. A non-transitory machine-readable medium having instructions which, when executed by a machine, cause the machine to perform operations comprising:
   displaying imagery on an imaging surface of an interactive display;
   detecting a plurality of contact locations at which at least one user contacts a touch sensor to control the interactive display;
   responsive to a determination that a deformation of a bounding box enclosing at least two of said plurality of contact locations exceeds a predetermined deformation threshold and responsive to a determination that a motion of said bounding box is less than a predetermined motion threshold, identifying a specific user gesture as a rotate gesture;
   determining a direction of rotation of the bounding box based on characteristics of the at least two of said plurality of contact locations;
   associating said specific user gesture with a display command; and
   executing said display command to alter the imagery.

16. The non-transitory machine-readable medium of claim 15, wherein the determining the direction of rotation further comprises designating said bounding box with one of an upper left corner and a lower right corner or a lower left corner and an upper right corner.

17. The non-transitory machine-readable medium of claim 15, further comprising arbitrarily choosing the direction of rotation responsive to a determination the direction of rotation is ambiguous.

18. The non-transitory machine-readable medium of claim 15, wherein the characteristics of the at least two of said plurality of contact locations includes a measurement of a torque applied to the touch sensor.

19. The non-transitory machine-readable medium of claim 15, wherein the characteristics of the at least two of said plurality of contact locations includes a relative intensity of the at least two of said plurality of contact locations.

20. The non-transitory machine-readable medium of claim 19, further comprising determining at least two true points of contact based on the relative intensity of the at least two of said plurality of contact locations.

* * * * *